United States Patent
Barfield

(10) Patent No.: US 8,161,913 B1
(45) Date of Patent: Apr. 24, 2012

(54) HOUND WALKER SYSTEM

(76) Inventor: Michael K. Barfield, Glen Burnie, MD (US)

( * ) Notice: Subject to any disclaimer, the term of this patent is extended or adjusted under 35 U.S.C. 154(b) by 34 days.

(21) Appl. No.: 12/460,013

(22) Filed: Jul. 10, 2009

(51) Int. Cl.
*A01K 15/02* (2006.01)
*A01K 29/00* (2006.01)

(52) U.S. Cl. .................... 119/700; 119/704; 119/703

(58) Field of Classification Search ............. 119/700, 119/704, 702, 421; *A01D 15/00; A01K 15/02, A01K 29/00*
See application file for complete search history.

(56) References Cited

U.S. PATENT DOCUMENTS

| | | | | |
|---|---|---|---|---|
| 2,506,322 A * | 5/1950 | Yushak | ............ | 119/700 |
| 3,485,213 A * | 12/1969 | Scanlon | ............ | 119/700 |
| 3,682,477 A * | 8/1972 | Harkins | ............ | 119/702 |
| 3,994,262 A * | 11/1976 | Suchowski et al. | ............ | 119/700 |
| 4,088,094 A * | 5/1978 | Howard | ............ | 119/700 |
| 4,332,217 A * | 6/1982 | Davis | ............ | 119/700 |
| 4,389,047 A * | 6/1983 | Hall | ............ | 482/2 |
| 4,776,581 A * | 10/1988 | Shepherdson | ............ | 482/27 |
| 5,116,255 A | 5/1992 | Keeling et al. | | |
| 5,125,361 A * | 6/1992 | Rowlands | ............ | 119/700 |
| 5,477,814 A | 12/1995 | Krause | | |
| 6,071,167 A * | 6/2000 | Yang | ............ | 446/236 |
| D484,284 S * | 12/2003 | Venson et al. | ............ | D30/160 |
| 6,740,009 B1 * | 5/2004 | Hall | ............ | 482/54 |
| 7,299,767 B2 * | 11/2007 | Tominaga et al. | ............ | 119/700 |
| 7,770,539 B1 * | 8/2010 | Zimmerman et al. | ............ | 119/700 |

* cited by examiner

*Primary Examiner* — Son T. Nguyen
*Assistant Examiner* — Shadi Baniani

(57) ABSTRACT

Couplable first and second hemispheres form a hollow spherical chamber. An opening in one of the hemispheres has a door movable between a closed and an open position. The top of a base is in a concave configuration with a radius of curvature essentially equal to the radius of curvature of the spherical chamber and forms a recipient surface for receiving and rotatably supporting the spherical chamber. An animal within the spherical chamber may walk and run in place for exercising in a relatively restricted space.

1 Claim, 4 Drawing Sheets

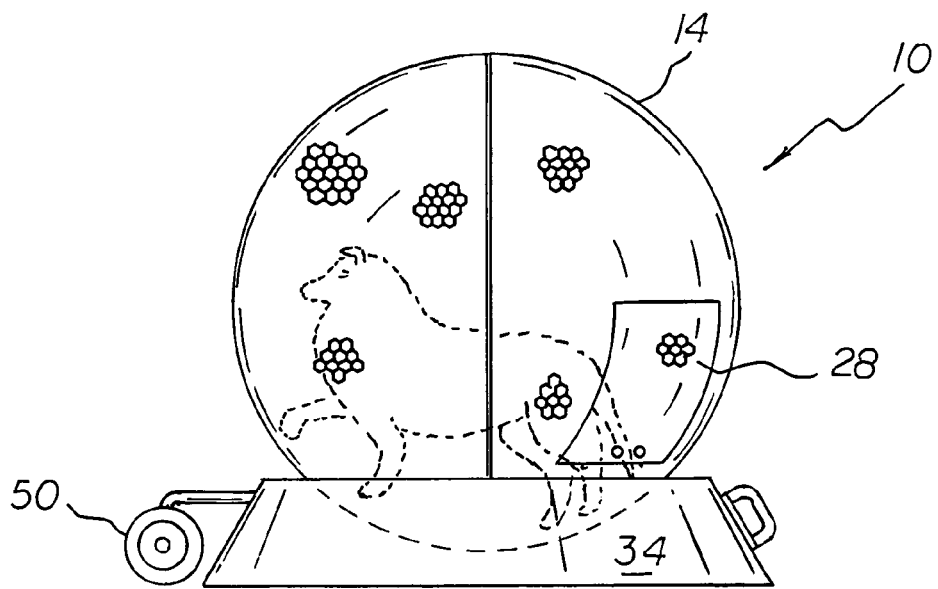
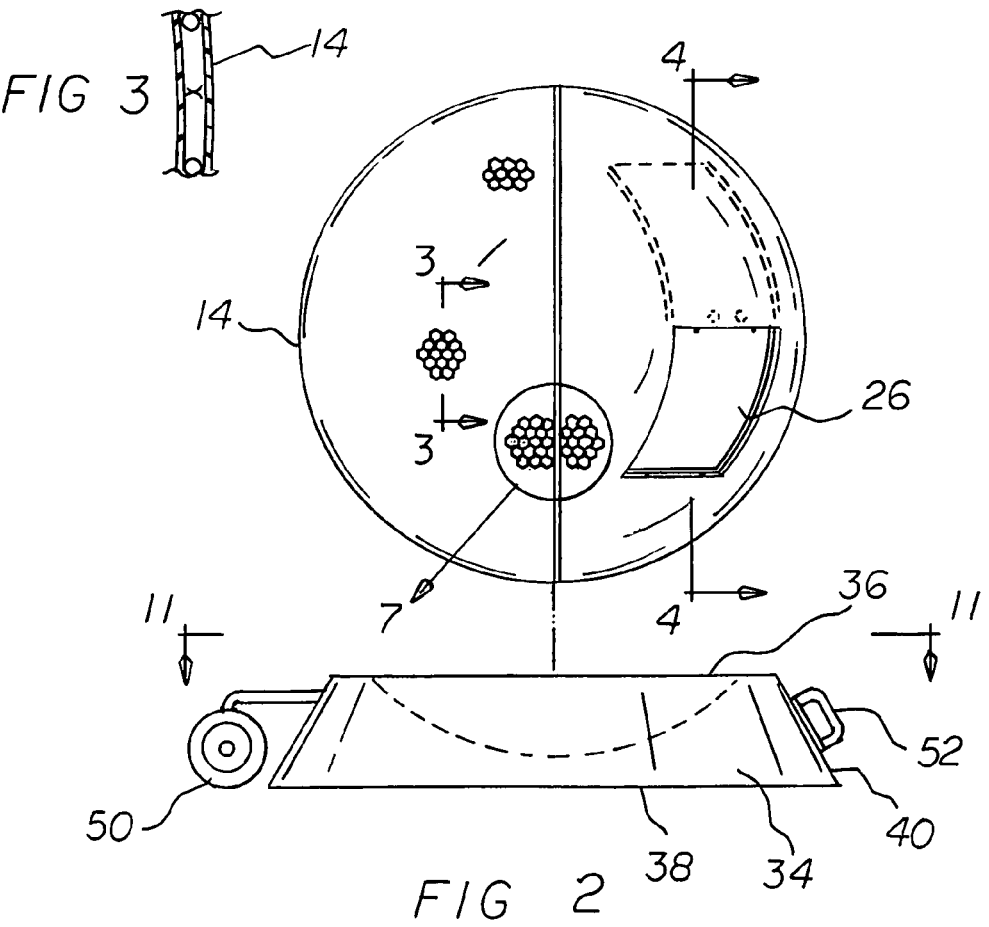

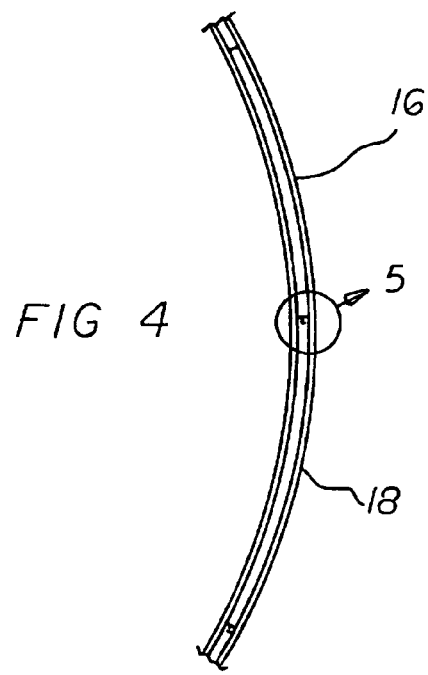
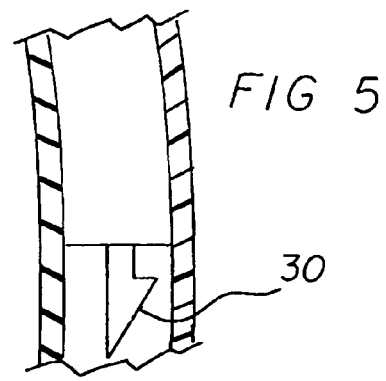
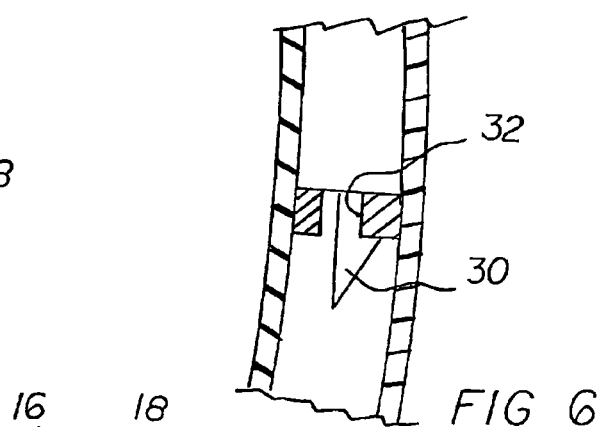
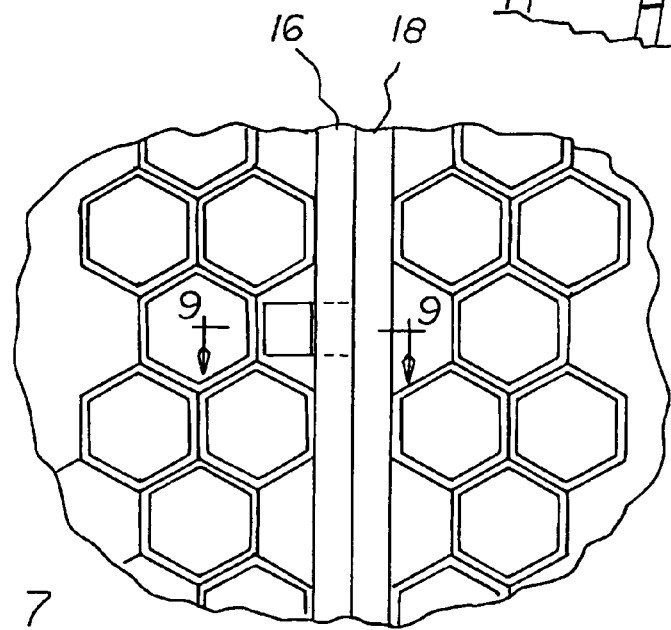

HOUND WALKER SYSTEM

BACKGROUND OF THE INVENTION

1. Field of the Invention

The present invention relates to a hound walker system and more particularly pertains to exercising a dog and wide variety of other animals in a relatively restricted space in a safe, convenient and economical manner.

2. Description of the Prior Art

The use of animal exercise systems of known designs and configurations is known in the prior art. More specifically, animal exercise systems of known designs and configurations previously devised and utilized for the purpose of exercising animals through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,116,255 issued May 26, 1992 to Keeling et al relates to an animal cage. Further U.S. Pat. No. 5,477,814 issued Dec. 26, 1995, to Krause relates to a track system with exercise ball.

While these devices fulfill their respective, particular objectives and requirements, the aforementioned patents do not describe a hound walker system that allows for exercising a dog and wide variety of other animals in a relatively restricted space in a safe, convenient and economical manner.

In this respect, the hound walker system according to the present invention substantially departs from the conventional concepts and designs of the prior art, and in doing so provides an apparatus primarily developed for the purpose of exercising a dog and wide variety of other animals in a relatively restricted space in a safe, convenient and economical manner.

Therefore, it can be appreciated that there exists a continuing need for a new and improved hound walker system which can be used for exercising a dog and wide variety of other animals in a relatively restricted space in a safe, convenient and economical manner. In this regard, the present invention substantially fulfills this need.

SUMMARY OF THE INVENTION

In view of the foregoing disadvantages inherent in the known types of animal exercise systems of known designs and configurations now present in the prior art, the present invention provides an improved hound walker system. As such, the general purpose of the present invention, which will be described subsequently in greater detail, is to provide a new and improved hound walker system and method which has all the advantages of the prior art and none of the disadvantages.

To attain this, the present invention essentially comprises a hound walker system. First provided is a spherical chamber. The chamber has a male hemisphere. The spherical chamber has a female hemisphere. The male hemisphere has a circular edge. The circular edge of the male hemisphere has forked male circular edge projections. The female hemisphere has a circular edge. The circular edge of the female hemisphere has circular edge recesses. The circular edge recesses are adapted to removably receive the circular edge projections. In this manner the spherical chamber is formed. The spherical chamber is fabricated of a strong wire mesh which is rubberized on all sides for durability, traction and for viewing into the spherical chamber.

The male hemisphere has a generally rectangular opening. The opening has a height. The height of the opening constitutes about 33 percent of the diameter of the male hemisphere. The opening has a width. The width of the opening constitutes about 25 percent of the diameter of the male hemisphere. A generally rectangular door is provided. The door is laterally spaced from the opening. The door is slidable between a closed position and an open position. In the closed position the door covers the opening. The door has a generally linear edge. The edge of the door has door projections. The opening has a generally linear edge. The edge of the opening has door recesses. The door recesses are adapted to removably receive the door projections. In this manner the door is secured in a closed position.

Provided next is a base. The base has a circular top. The base has a circular bottom. The base also has a frusto-conical side wall. The top has a diameter. The diameter of the top is less than the diameter of the spherical chamber. The bottom has a diameter. The diameter of the bottom is greater than the diameter of the spherical chamber. The top is in a concave configuration. The top has a radius of curvature. The radius of curvature of the top is essentially equal to the radius of curvature of the spherical chamber. The top has a plurality of apertures. A spherical ball is provided. The spherical ball extends upwardly and partially through an associated one of the apertures. A coil spring is provided. The coil spring urges an associated one of the plurality of balls upwardly through an associated one of the apertures. In this manner a recipient surface is formed for receiving and rotatably supporting the spherical chamber. Further in this manner a dog within the spherical chamber may run and walk in place for exercise in a relatively restricted space.

Further provided are wheels. The wheels are coupled to the side wall of the base.

Provided last is a handle. The handle is provided on the side wall of the base. The handle is provided diametrically opposite from the wheels. In this manner the moving of the base with respect to a floor is facilitated.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hound walker system which has all of the advantages of the prior art animal exercise systems of known designs and configurations and none of the disadvantages.

It is another object of the present invention to provide a new and improved hound walker system which may be easily and efficiently manufactured and marketed.

It is further object of the present invention to provide a new and improved hound walker system which is of durable and reliable constructions.

An even further object of the present invention is to provide a new and improved hound walker system which is susceptible of a low cost of manufacture with regard to both materials and labor, and which accordingly is then susceptible of low prices of sale to the consuming public, thereby making such hound walker system economically available to the buying public.

Even still another object of the present invention is to provide a hound walker system for exercising a dog and wide variety of other animals in a relatively restricted space in a safe, convenient and economical manner.

Lastly, it is an object of the present invention to provide a new and improved hound walker system. A hollow spherical chamber has couplable first and second hemispheres. An opening is provided in one of the hemispheres. A door is movable between a closed and an open position with respect to the opening. A base has a top, a bottom and a side wall. The top is in a concave configuration with a radius of curvature essentially equal to the radius of curvature of the spherical chamber. The top forms a recipient surface for receiving and rotatably supporting the spherical chamber. In this manner an animal within the spherical chamber may walk and run in place for exercising in a relatively restricted space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a hound walker system constructed in accordance with the principles of the present invention.

FIG. 2 is an exploded front elevational view of the system shown in FIG. 1 but with the door open.

FIG. 3 is a cross sectional view taken along line 3-3 of FIG. 2.

FIG. 4 is a cross sectional view taken along line 4-4 of FIG. 2.

FIGS. 5 and 6 are enlarged showing of the door lock taken at circle 5 of FIG. 4.

FIG. 7 is an enlarges showing of a portion of the surface of the sphere.

The same reference numerals refer to the same parts throughout the various Figures.

DESCRIPTION OF THE PREFERRED EMBODIMENT

Figure 8:
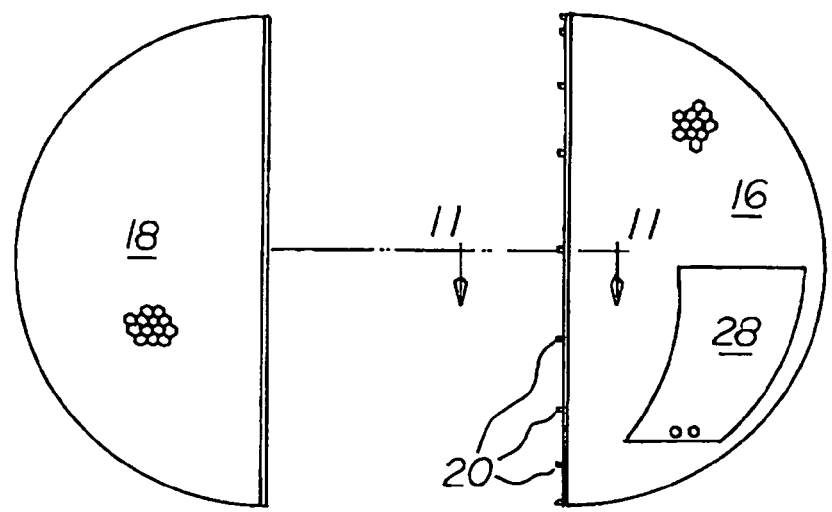
FIG. 8 is an exploded front elevational view of the system with the hemispheres separated.
Figure 9:
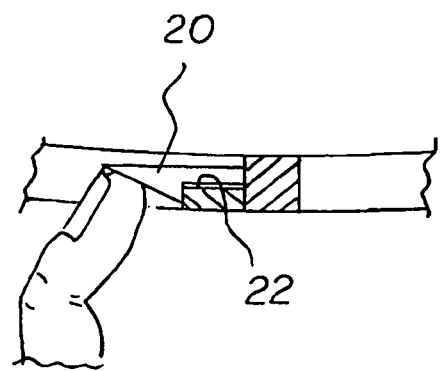
FIGS. 9 and 10 are enlarged showings of the hemisphere locks taken at line 9-9 of FIG. 8.
Figure 10:
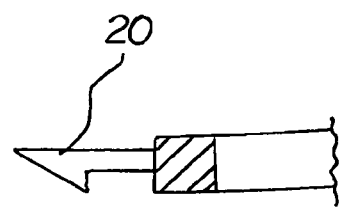
Figure 11:
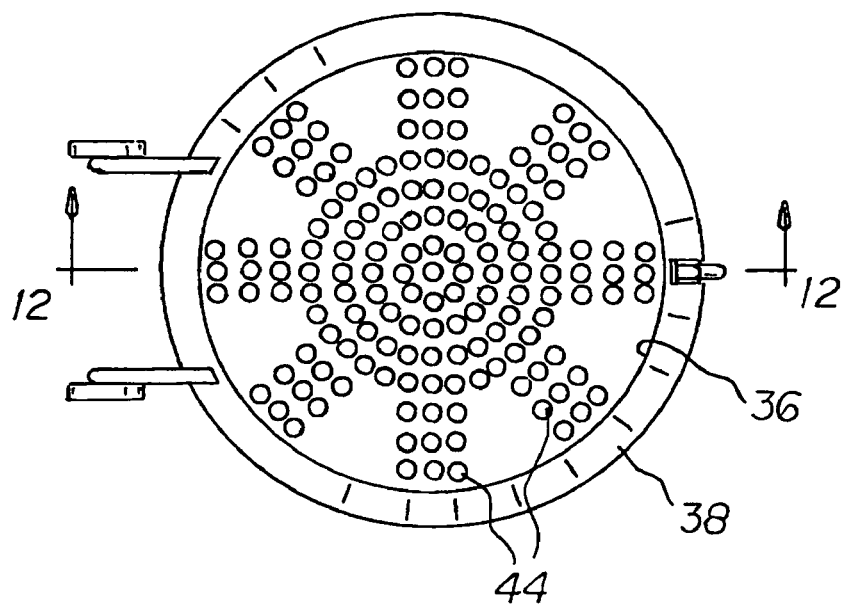
FIG. 11 is a plan view of the base taken along line 11-11 of FIG. 2.
Figure 12:
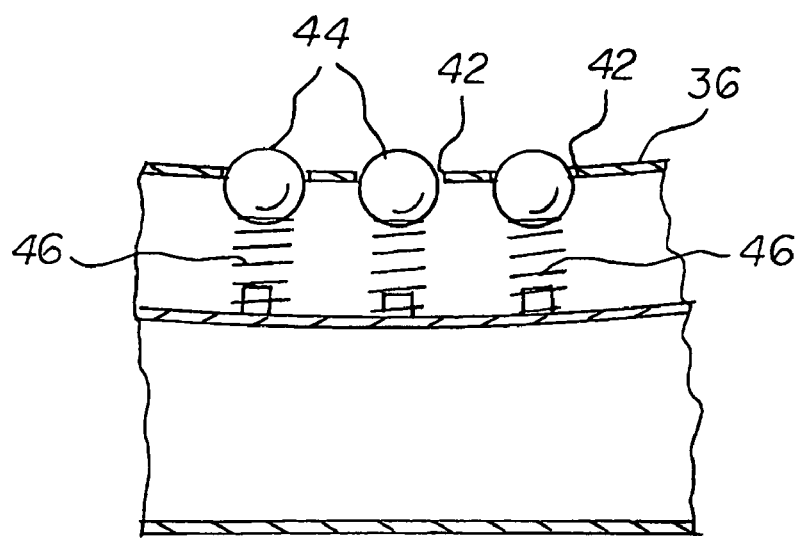
FIG. 12 is a cross sectional view taken along line 12-12 of FIG. 11.

With reference now to the drawings, and in particular to FIG. 1 thereof, the preferred embodiment of the new and improved hound walker system embodying the principles and concepts of the present invention and generally designated by the reference numeral 10 will be described.

The present invention, the hound walker system 10 is comprised of a plurality of components. Such components in their broadest context include a hollow spherical chamber, an opening and a base. Such components are individually configured and correlated with respect to each other so as to attain the desired objective.

First provided is a spherical chamber 14. The chamber has a male hemisphere 16. The spherical chamber has a female hemisphere 18. The male hemisphere has a circular edge. The circular edge of the male hemisphere has forked male circular edge projections 20. The female hemisphere has a circular edge. The circular edge of the female hemisphere has circular edge recesses 22. The circular edge recesses are adapted to removably receive the circular edge projections. In this manner the spherical chamber is formed. The spherical chamber is fabricated of a strong wire mesh which is rubberized on all sides for durability, traction and for viewing into the spherical chamber.

The male hemisphere has a generally rectangular opening 26. The opening has a height. The height of the opening constitutes about 33 percent of the diameter of the male hemisphere. The opening has a width. The width of the opening constitutes about 25 percent of the diameter of the male hemisphere. A generally rectangular door 28 is provided. The door is laterally spaced from the opening. The door is slidable between a closed position and an open position. In the closed position the door covers the opening. The door has a generally linear edge. The edge of the door has door projections 30. The opening has a generally linear edge. The edge of the opening has door recesses 32. The door recesses are adapted to removably receive the door projections. In this manner the door is secured in a closed position.

Provided next is a base 34. The base has a circular top 36. The base has a circular bottom 38. The base also has a frustoconical side wall 40. The top has a diameter. The diameter of the top is less than the diameter of the spherical chamber. The bottom has a diameter. The diameter of the bottom is greater than the diameter of the spherical chamber. The top is in a concave configuration. The top has a radius of curvature. The radius of curvature of the top is essentially equal to the radius of curvature of the spherical chamber. The top has a plurality of apertures 42. A spherical ball 44 is provided. The spherical ball extends upwardly and partially through an associated one of the apertures. A coil spring 46 is provided. The coil spring urges an associated one of the plurality of balls upwardly through an associated one of the apertures. In this manner a recipient surface is formed for receiving and rotatably supporting the spherical chamber. Further in this manner a dog within the spherical chamber may run and walk in place for exercise in a relatively restricted space.

Further provided are wheels 50. The wheels are coupled to the side wall of the base.

Provided last is a handle 52. The handle is provided on the side wall of the base. The handle is provided diametrically opposite from the wheels. In this manner the moving of the base with respect to a floor is facilitated.

During use of the present invention, a dog or other pet is placed interior of the sphere. The sphere in positioned upon the upper concave surface of the base. When the dog begins running, the sphere will begin rotating in the base but the base and sphere will neither advance or take up any added space on the floor upon which the base is located. The objects of the invention are thus met most successfully.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hound walker system for exercising a dog and a wide variety of other animals in a relatively restricted space, the system comprising, in combination:

a spherical chamber formed of a male hemisphere and a female hemisphere, the male hemisphere having a circular edge with forked male circular edge projections, the female hemisphere having a circular edge with circular edge recesses adapted to removably receive the circular edge projections for forming the spherical chamber, the spherical chamber being fabricated of a strong wire mesh which is rubberized on all sides for durability, traction and for viewing into the spherical chamber;

a generally rectangular opening in the male hemisphere, the opening having a height constituting about 33 percent of the diameter of the male hemisphere and a width constituting about 25 percent of the diameter of the male hemisphere, a generally rectangular door slidable between a closed position covering the opening and an open position laterally spaced from the opening, the door having a generally linear edge with door projections, the opening having a generally linear edge with door recesses adapted to removably receive the door projections for securing the door in a closed position;

a base having a circular top and a circular bottom and a frusto-conical side wall, the top having a diameter less than the diameter of the spherical chamber, the bottom having a diameter greater than the diameter of the spherical chamber, the top being in a concave configuration with a radius of curvature essentially equal to the radius of curvature of the spherical chamber, the top having a plurality of apertures with a spherical ball extending upwardly and partially through an associated one of the apertures, a coil spring urging an associated one of the plurality of balls upwardly through an associated one of the apertures to form a recipient surface for receiving and rotatably supporting the spherical chamber whereby a dog within the spherical chamber may run and walk in place for exercise in a relatively restricted space;

wheels coupled to the side wall of the base; and a handle on the side wall of the base diametrically opposite from the wheels for facilitating the moving of the base with respect to a floor.

* * * * *